(12) United States Patent
Campbell et al.

(10) Patent No.: US 6,170,955 B1
(45) Date of Patent: Jan. 9, 2001

(54) VEHICLE MOUNTED OPTICAL ASSEMBLY

(75) Inventors: Hugh Campbell, Anaheim; Jeffrey R. Coleman, Santa Ana, both of CA (US)

(73) Assignee: Iteris, Inc., Anaheim, CA (US)

( * ) Notice: Under 35 U.S.C. 154(b), the term of this patent shall be extended for 0 days.

(21) Appl. No.: 09/038,666

(22) Filed: Feb. 27, 1998

(51) Int. Cl.⁷ .............................. G02B 7/00; G02B 11/04; A47F 5/00
(52) U.S. Cl. ......................... 359/509; 359/513; 248/208
(58) Field of Search .................................. 359/507, 509, 359/513, 820, 395; 248/205.3, 187.1, 316.7, 208; 352/243

(56) References Cited

U.S. PATENT DOCUMENTS

| | | |
|---|---|---|
| 3,176,602 | 4/1965 | Wilt . |
| 3,752,376 | 8/1973 | Shelton et al. ............... 224/42.45 |
| 3,833,196 | 9/1974 | Protzman ......................... 95/86 |
| 3,859,899 | * 1/1975 | Mills ............................ 359/509 |
| 3,928,894 | * 12/1975 | Bury et al. ....................... 24/73 |
| 4,029,246 | 6/1977 | Woodruff .................... 224/42.45 |
| 4,093,364 | 6/1978 | Miller .......................... 352/132 |
| 4,846,382 | 7/1989 | Foultner et al. .............. 224/42.42 |
| 5,096,287 | 3/1992 | Kakinami et al. ............. 352/152 |
| 5,111,289 | 5/1992 | Lucas et al. .................. 358/108 |
| 5,137,238 | 8/1992 | Hutten ......................... 248/206.3 |
| 5,246,193 | 9/1993 | Faidley ....................... 248/206.3 |

* cited by examiner

Primary Examiner—Cassandra Spyrou
Assistant Examiner—Jared Treas
(74) Attorney, Agent, or Firm—Myers, Dawes & Andras LLP

(57) ABSTRACT

An optical assembly for mounting in a vehicle employs a two piece assembly including a bracket having a front surface and a back surface and an optical device having a front surface and a lens element on the front surface. The back surface of the bracket is connected to the vehicle and the front surface of the optical device is removably attached to the back surface of the bracket. The lens element focuses an image through a windshield of the vehicle. In one embodiment of the present invention, the optical device further comprises at least one notch member and a support extension member and the bracket includes an opening and further comprises at least one groove member. The at least one notch member is positioned to removably attach to the at least one groove member, and the support extension member is positioned to removably attach to the opening. In one embodiment, the assembly is mounted to the vehicle windshield so that a driver of said vehicle has an unobstructed view of a road.

11 Claims, 4 Drawing Sheets

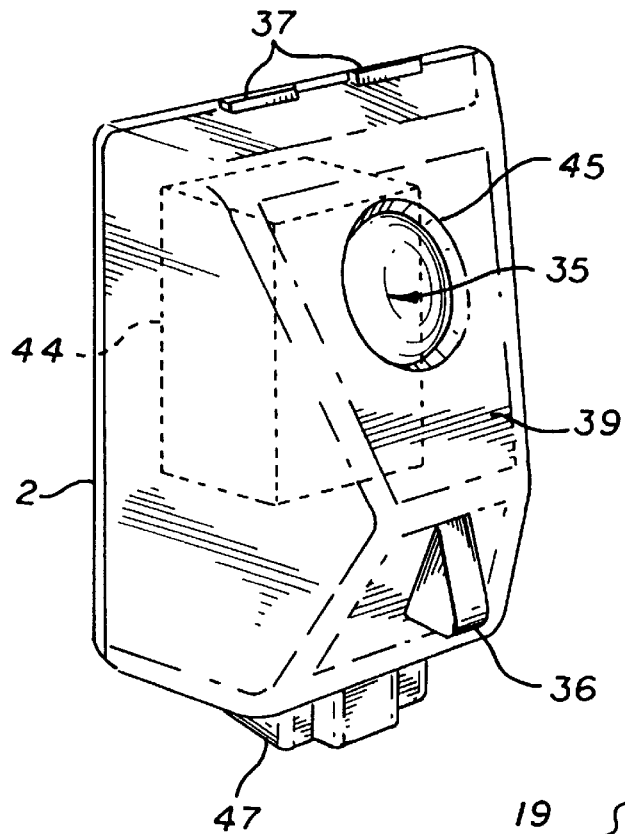
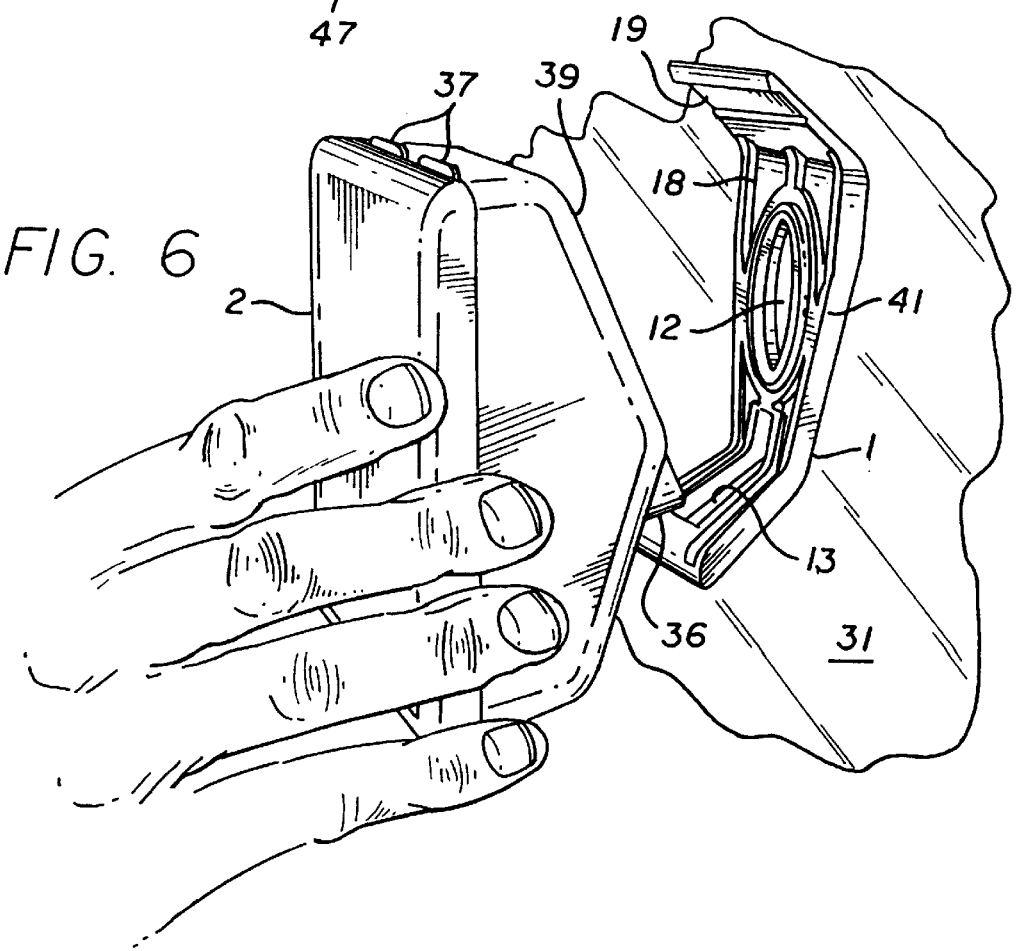

VEHICLE MOUNTED OPTICAL ASSEMBLY

FIELD OF THE INVENTION

The present invention relates to an optical assembly device for mounting in or on a vehicle. More particularly, the present invention relates to a vehicle optical assembly which can reduce fogging of the optics and be easily removable when mounted to the windshield of a vehicle.

BACKGROUND OF THE INVENTION

Vehicle mounted cameras and other optical assemblies have typically been employed in specialty applications such as law enforcement, surveillance, television or film applications, etc. In such applications, there is little concern with suitability of the optical assembly and related vehicle mounting system for volume manufacturing. Also, there is relatively little concern for aesthetics or creation of a functional yet unobtrusive design. Rather, the desire is usually to allow a user in the vehicle to have ready access to, and control of, the camera or other device, and an obtrusive design is tolerated if not desired.

Relatively recently, however, systems have been proposed which could be incorporated in virtually all vehicles for safety or driver convenience and which require a camera or other optical assembly to be mounted in the vehicle. For such applications, the optical assembly must be unobtrusive as well as functional. Also, the assembly must be adapted for ease of service or replacement. Once example of such a safety application which is very important is a lane departure warning system.

When driving on a roadway, one of the primary requirements for safe transportation is the ability to keep the vehicle in the lane of travel. Of course, in most situations a driver can safely accomplish this task by paying attention to the road. Sometimes, however, a driver fails to keep the vehicle in the desired lane (e.g., the driver falls asleep, the driver is distracted with the radio or other vehicle system, the driver is diverted by other vehicles or roadside conditions, etc.). Therefore, systems have been proposed which can issue a warning to the driver if the vehicle is proceeding outside of the designated lane.

This type of warning system requires an optical assembly which can be mounted on the vehicle. Other driver assist or safety systems have also been proposed which require a vehicle mounted optical assembly such as a camera. However, implementation of such a vehicle mounted optical assembly presents several problems. First, for safety reasons, the assembly must be mounted in such a way so as not to impede the view of the road to the driver. Further, the device may have to be able to meet vehicle laws regulating obstruction to viewing which are found in various jurisdictions. Second, the housing for the electronics and optical equipment should be easily removable for repair, reprogramming, testing, etc. Third, the optics in the electronics/camera enclosure is negatively affected by any vision obstruction including fogging of the windshield or the lens element of the device.

Therefore, a need presently exists for an optical assembly which may be employed in vehicles and which overcomes the above-noted problems.

SUMMARY OF THE INVENTION

The present invention provides an optical assembly which allows the optics and electronics of the system to be removably mounted to a vehicle, for example, to the vehicle windshield in front of the dashboard.

The present invention further provides an optical assembly which can be mounted so as not to obstruct the driver's view of the road.

The present invention further provides a housing for the electronics and optical equipment which is easily removable for repair, reprogramming, testing, etc.

The present invention further provides an electronics/camera enclosure which reduces vision obstruction for an optical system including fogging of the windshield or the lens element of the device.

In accordance with a preferred embodiment of the present invention, an optical assembly for mounting in a vehicle employs a two piece assembly comprising a bracket having a front surface and a back surface and an optical device having a front surface and a lens element on the front surface. The front surface of the bracket is connected to the vehicle and the front surface of the optical device is removably attached to the back surface of the bracket with the lens element configured behind an opening in the bracket. The lens element focuses an image, e.g. of the roadway provided through a windshield of the vehicle onto an imager in the optical device.

In one embodiment of the present invention, the optical device further comprises a notch member and a support extension member and the bracket includes an opening and a groove member. The notch member is positioned to removably attach to the groove member, and the support extension member is positioned to removably attach to the opening. In one embodiment, the assembly is mounted to the vehicle windshield so that a driver of said vehicle has an unobstructed view of a road.

The bracket preferably further includes means for preventing fogging of the lens element. In one embodiment of the present invention, the means for preventing fogging can be a channel in the bracket to allow airflow over the lens element. In another embodiment, the means for preventing fogging can be a seal located around the opening for creating a moisture proof seal surrounding the lens element between the bracket and the vehicle windshield.

A more complete understanding of the vehicle mounted optical assembly will be afforded to those skilled in the art, as well as a realization of additional advantages and objects thereof, by a consideration of the following detailed description of the preferred embodiments. Reference will be made to the appended sheets of drawings which will first be described briefly.

BRIEF DESCRIPTION OF THE DRAWINGS

FIG. 5 is a front perspective view of an optical device of the optical assembly according to one embodiment of the present invention; and FIGS. 6 & 7 illustrate the assembly of the two piece optical assembly according to one embodiment of the present invention.

DETAILED DESCRIPTION OF THE PREFERRED EMBODIMENTS

The present invention provides an optical assembly which allows the optics and associated electronics of the system to be removably mounted, for example, to the windshield of a vehicle in front of the dashboard. A preferred application is for an optical lane departure warning system, but the invention is not so limited. An active vehicle steering system employing lane boundary detection from an optical assembly including a camera is another application, an example of which is shown in U.S. Pat. No. 5,485,378 issued Jan. 16, 1996 to Franke, et al., the disclosure of which is incorporated herein by reference. Many other active and passive vehicle safety and driver assistance applications are also possible, however. In the detailed description that follows, like element numerals are used to describe like elements illustrated in one or more of the above-described figures.

Figure 1:
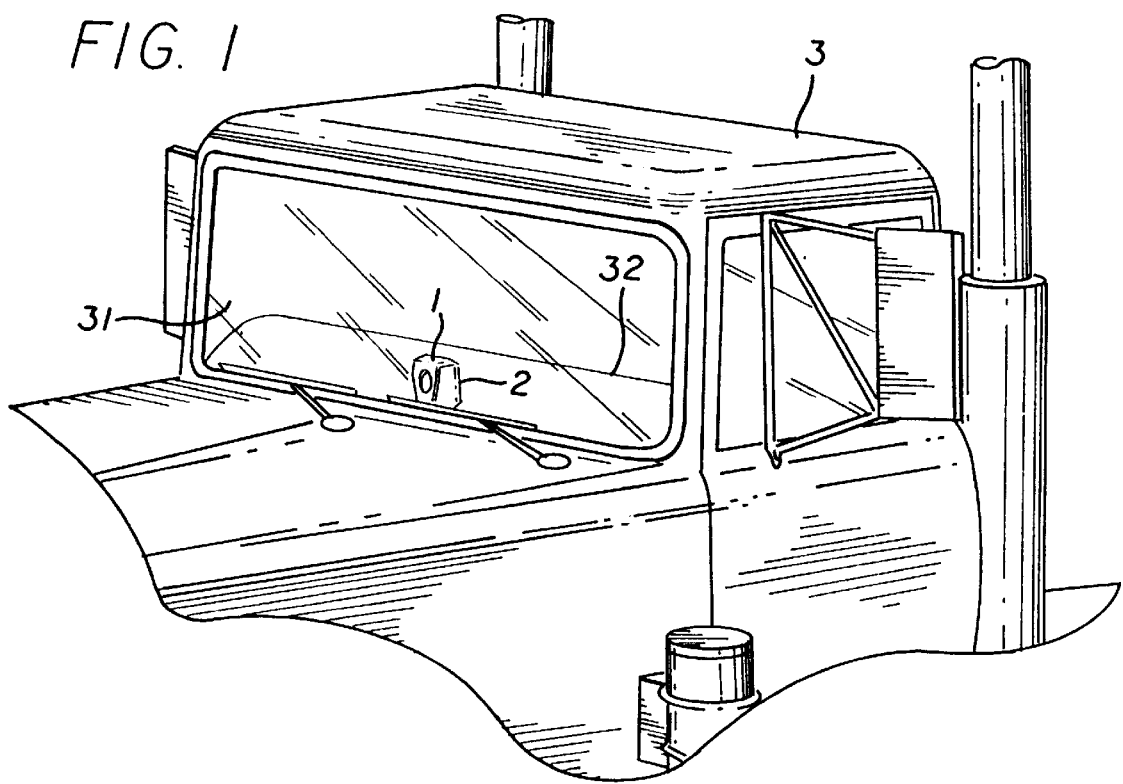
FIG. 1 depicts an optical assembly mounted in a vehicle according to one embodiment of the present invention.

Referring first to FIG. 1, a depiction of the overall architecture of an optical assembly for a lane departure warning system according to one embodiment is shown mounted in front of the dash of a vehicle. The optical assembly of the present invention is preferably a two piece assembly and includes mounting bracket 1 and optical device 2. The optical assembly is not drawn to scale in FIG. 1 and is enlarged relative to the vehicle dash for ease of illustration. Optical device 2 includes a housing as shown which contains the various optical components that are necessary for the optical monitoring system, e.g., a lane departure warning system in a presently preferred application, and may preferably be a digital camera. Optical device 2 is shown in the operating position as inserted in bracket 1. However, the two piece nature of the optical assembly allows optical device 2 to be easily removed from bracket 1 for repair or replacement, programming, testing, etc. Both bracket 1 and optical device 2 can be made of any suitable material, including metal, however a hard plastic is presently preferred.

Bracket 1 is illustrated in FIG. 1 attached to windshield 31 of vehicle 3 in front of dashboard 32, inside vehicle 3. In other embodiments of the present invention, bracket 1 can also be attached to other locations of vehicle 3, such as on the dashboard or roof, or the exterior such as behind a transparent panel in the vehicle grill, etc. In addition, while vehicle 3 is shown in one embodiment as being a truck, the optical mounting assembly of the present invention can be employed for other vehicles, such as automobiles or motorcycles.

Figure 2:
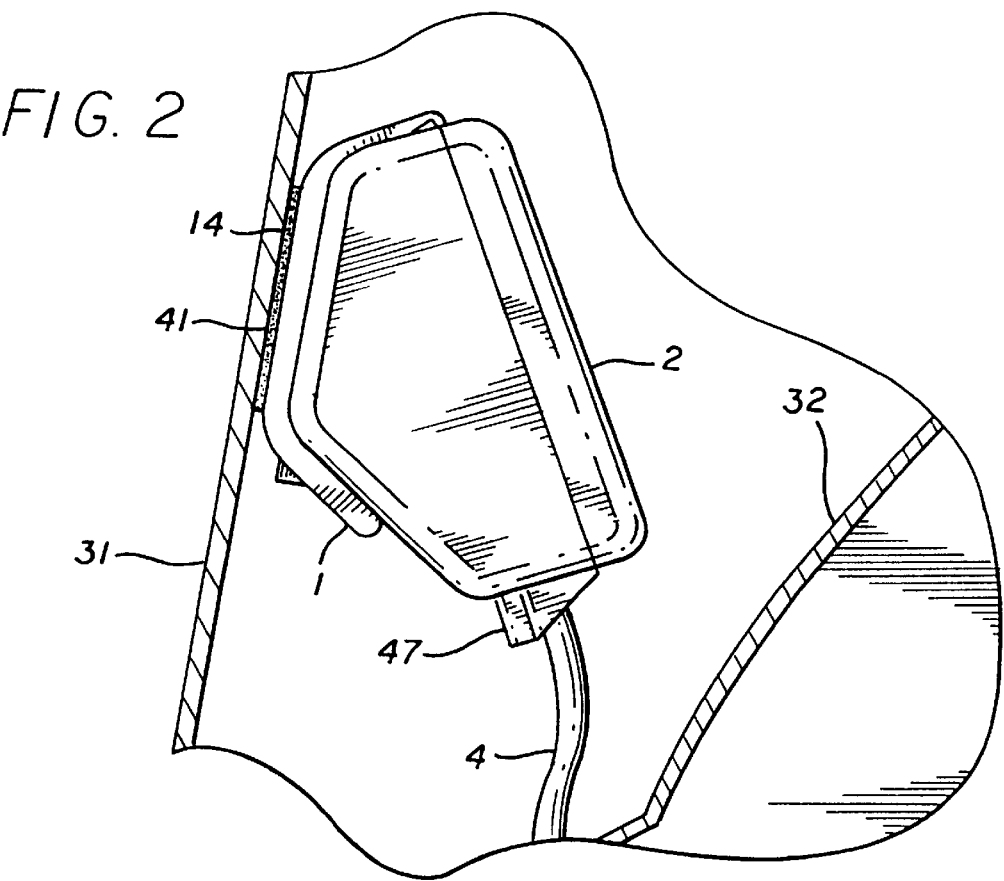
FIG. 2 is a side view of the optical assembly according to one embodiment of the present invention.

The optical assembly, including bracket 1 and optical device 2, is shown in a side view in FIG. 2 according to one embodiment of the present invention. Optical device 2 is shown in the operating position inserted in mounting bracket 1. Bracket 1 is fixedly attached to windshield 31, for example, by use of an adhesive 41. As shown in this embodiment, adhesive 41 is situated to create a tight seal between windshield 31 and the front surface 14 of bracket 1. Flexible cable 4 connects to electrical socket 47 via a mated plug so that the two parts can be easily separated to remove optical device 2 for repair, reprogramming, etc. Flexible cable 4 contains leads which route signals such as vehicle status (e.g., speed, turn signal status, etc.), disable inputs, and warning/stereo mute signals between optical device 2 and the vehicle 3 through dashboard 32. Flexible cable 4 also provides power from the vehicle power supply to optical device 2. A need for power leads in flexible cable 4 could be completely eliminated by including a battery (not shown) in or on optical device 2. Also, while some or all of the image processing and warning control circuitry and software are preferably configured inside optical device 2, this electronics could optionally be configured outside of the housing of optical device 2. Normally, some wiring from optical device 2 will be required however, to avoid providing audible warning amplification circuits and speakers in device 2.

Figure 3:
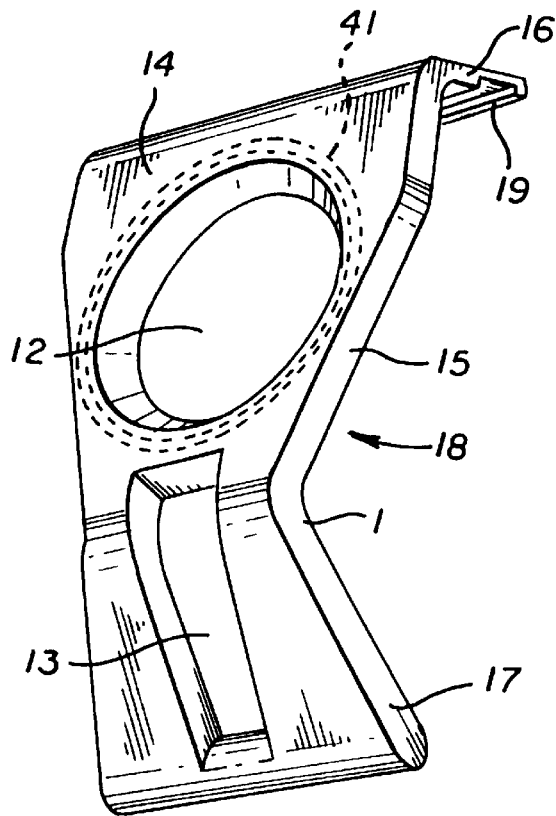
FIGS. 3 & 4 are front perspective views of two brackets for an optical assembly according to two embodiments of the present invention.
Figure 4:
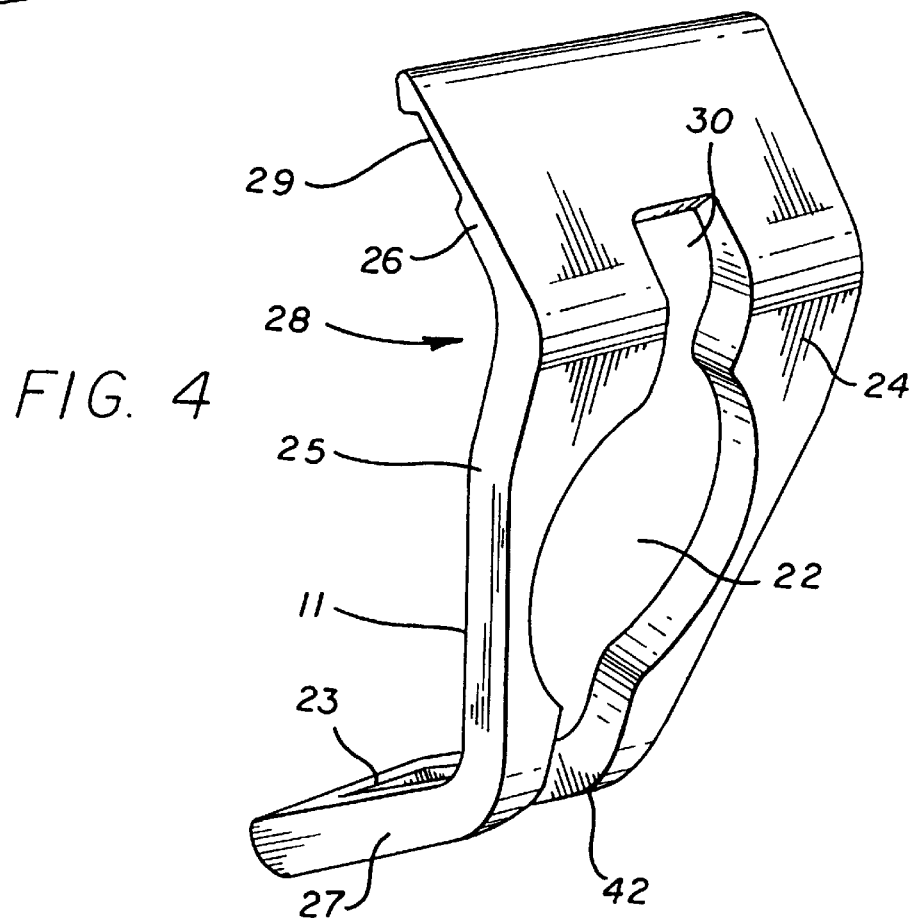

FIGS. 3 & 4 show two embodiments of the bracket of the present invention. These two embodiments provide different solutions to the problem of fogging of the lens of the optical device. Which approach is preferred will depend on the combination of the vehicle dash and windshield configuration and whether a suitable airflow is adjacent to the assembly.

As shown in FIG. 3, bracket 1 generally is an opened up U-shaped device comprising a base 15 and two arm members 16 and 17. Base 15 has a flat front surface 14 and a back surface 18. In operation, front surface 14 is fixedly attached to windshield 31. This attachment can be accomplished by any suitable means, including glue or adhesive tape. Such attachment means also preferably serves as a seal which completely surrounds opening 12 and prevents moisture entering. Alternatively, a separate seal, such as an annular gasket may be employed. If formed of a suitable mastic material, such gasket could also affix the bracket to the windshield. Also, an annular seal 41 is shown located on back surface 18 of bracket 1 and encircles circular opening 12. Annular seal 41 can be made of plastic or rubber material and is employed to create a seal between back surface 18 and optical device 2 in order to prevent fogging of the lens element of optical device 2. When optical device 2 is seated in position against bracket 1, circular opening 12 allows optical device 2 to receive light for imaging the roadway for lane detection, through windshield 31. Elongated opening 13 and groove members 19 are located so as to provide an anchoring mechanism for holding optical device 2 in place against bracket 1, as described below.

As shown in FIG. 4, bracket 11 is another embodiment of the bracket for the optical mounting assembly of the present invention. Bracket 11 generally also is an oblique U-shaped device comprising a base 25 and two arm members 26 and 27. Base 25 has a front surface 24 and a back surface 28. In operation, front surface 24 is fixedly attached to windshield 31. This attachment can be accomplished by any suitable means, including glue or adhesive tape. Optical device 2 is removably attached to bracket 11 against back surface 28. Base 25 also has a circular opening 22. When optical device 2 is seated in position against bracket 1, circular opening 22 allows optical device 2 to receive an image for lane detection through windshield 31. Elongated opening 23 and groove members 29 are located so as to provide an anchoring mechanism for holding optical device 2 in place against bracket 11. Finally, openings 30 & 42 are located so as to create a channel to allow airflow from the vehicle air blowers to pass through bracket 11 and across the lens element of housing component device 2 to prevent fogging of the lens element.

In FIG. 5, one embodiment of optical device 2 is shown. Opening 35 is located on front surface 39. A lens element 45 is located within or behind opening 35. Imager 44 is shown by dashed lines within optical device 2 for illustration purposes. In operation, for example, in a preferred embodiment of a lane departure warning system, an image of the roadway ahead of the vehicle is formed by the lens element 45 and focused on imager 44 to detect lane markers on the roadway.

Also, as shown in FIG. 5, optical device 2 includes notches 37 and support extension 36 which are used to secure optical device 2 to bracket 1, as described below.

FIG. 6 depicts the operation of mounting optical device 2 to bracket 1 (shown in FIG. 3). In this embodiment of the present invention, bracket 1 is shown fixedly attached to windshield 31. Optical device 2 is then mounted to bracket 1 at two connection points as follows: 1) support extension 36 is placed inside elongated opening 13, and 2) notches 37 are locked into groove members 19. When in the operating position, front surface 39 of optical device 2 is seated against back surface 18 of bracket 1. In addition, in this embodiment of the present invention, annular seal 41 is shown surrounding opening 12. Annular seal 41 can comprise any suitable material such as rubber. In operation, sealing device 41 creates a seal around the lens element located within opening 35 of optical device 2 in order to prevent fogging of the lens element. It will be appreciated that the optical device may thus be easily mounted to, and removed from, bracket 1 to facilitate repair or replacement, adjustment, etc.

Figure 7:
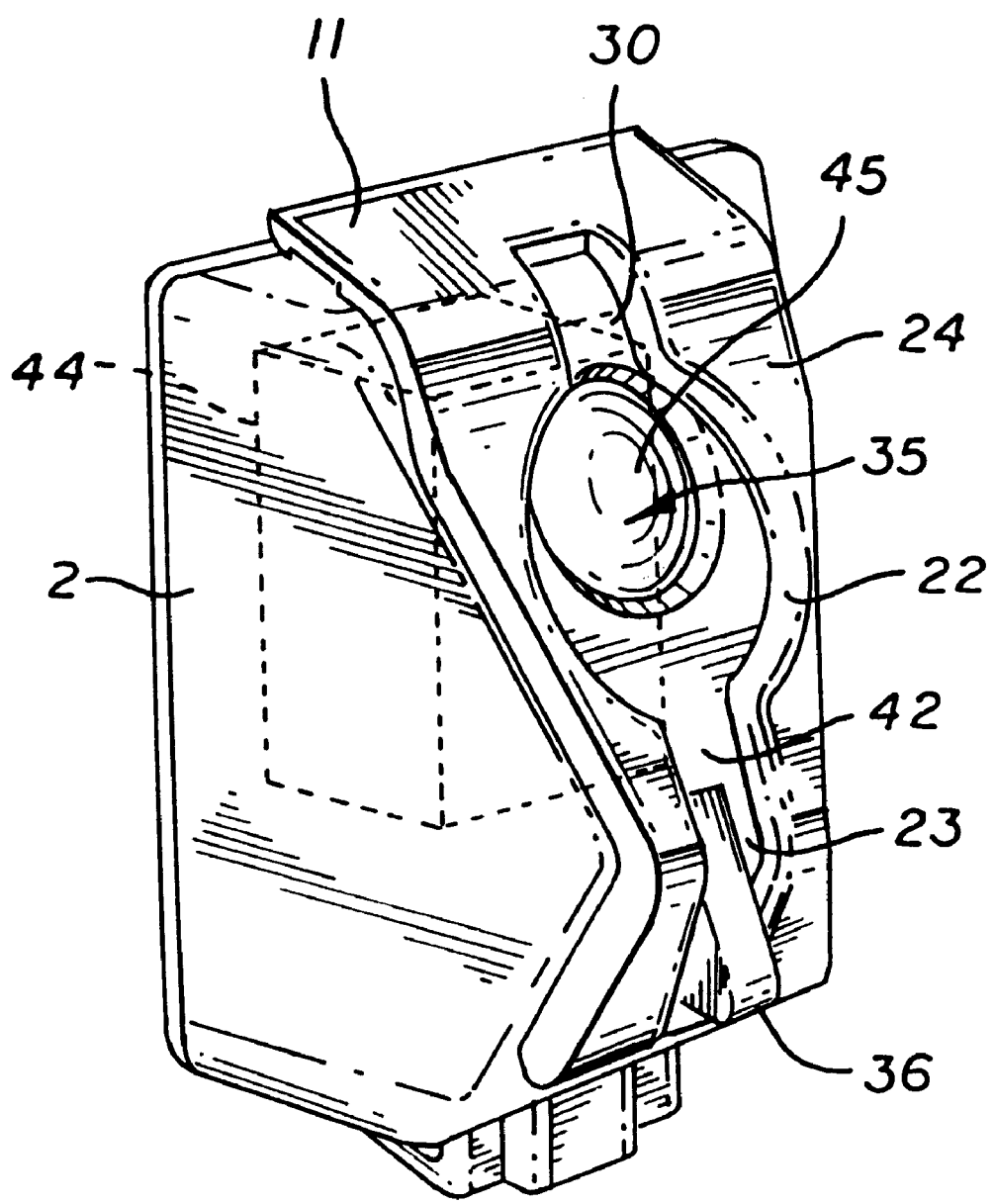

FIG. 7 shows the optical assembly of the present invention in the operating position according to another embodiment of the bracket. Optical device 2 is seated within bracket 11 (as shown in FIG. 4) and removably attached at two connection points as follows: 1) support extension 36 is placed inside elongated opening 23, and 2) notches 37 are locked into grooves 29 (not shown). Front surface 24 of bracket 11 can be fixedly attached to windshield 31 of vehicle 3. In operation, the lens element 45, which is located within opening 35 of optical device 2, forms an image, e.g., the roadway ahead of the vehicle from light provided through circular opening 22 of bracket 11 and windshield 31. Imager 44 receives the roadway images and provides digital image data corresponding to these images to be used, e.g., for lane detection. Also as shown, openings 30 & 42 in bracket 11 are located so as to create a channel to allow airflow from a vehicle air blower to pass through bracket 11 and across the lens element of optical device 2 to prevent fogging of the lens element.

Therefore, both embodiments of the mounting bracket allow the optical device 2 to be securely mounted yet easily removed. Also, the problem of fogging of the lens element of the optical device is avoided. Furthermore, the overall assembly is unobtrusive and may easily fit behind the dash of most vehicles.

Having thus described a preferred embodiment of a vehicle mounted optical assembly, it should be apparent to those skilled in the art that the above noted and additional advantages of the within system have been achieved. It should also be appreciated that various modifications, adaptations, and alternative embodiments thereof may be made within the scope and spirit of the present invention. The invention is thus not limited to the illustrated embodiments, but is defined by the following claims. For example, the optical assembly need not be mounted to the windshield of a vehicle, but may be mounted elsewhere. Also, the bracket may be integrated into a position of the vehicle as part of the vehicle design.

What is claimed is:

1. An optical assembly for mounting in or on a vehicle windshield, the assembly comprising:

a bracket having a front surface, a back surface, and an opening passing from the front to back surface, wherein said front surface of said bracket is adapted to be mounted to said vehicle windshield; and an optical device having a front surface and an optical element, wherein said front surface of said optical device is removably attached to said back surface of said bracket with the optical element configured behind the opening of the bracket such that an optical path is provided to the optical element from the windshield through the bracket opening;

and wherein said bracket further comprises an air flow channel for allowing air flow between the windshield and optical element and across the optical path and preventing fogging of said optical element and windshield.

2. The optical assembly as recited in claim 1, wherein said optical device further comprises at least one notch member and a support extension member, and wherein said bracket includes a mounting opening and at least one groove member, and wherein said at least one notch member is positioned to removably attach to said at least one groove member, and said support extension member is positioned to removably fit within said mounting opening.

3. The optical assembly as recited in claim 1, wherein said assembly has a partially wedge-shaped configuration to allow the assembly to be mounted to said vehicle windshield between the vehicle dash and the windshield so that a driver of said vehicle has an unobstructed view of a road.

4. The optical assembly as in claim 1, wherein the optical element is a lens element.

5. An optical assembly as set out in claim 1, wherein said air flow channel is oriented generally vertically across the vehicle windshield when the bracket is mounted to the vehicle windshield.

6. An optical assembly as set out in claim 1, wherein the bracket has a flat section with a flat front surface for engaging the windshield and a curved section curving away from the windshield and wherein the air flow channel extends through the flat section and a portion of the curved section.

7. An optical assembly as set out in claim 6, wherein said bracket is a single integral piece.

8. An optical assembly as set out in claim 6, wherein the curved section of the bracket has two portions on opposite sides of the flat section of the bracket.

9. An optical assembly as set out in claim 8, wherein the air flow channel passes through the flat section of the bracket between the two portions of the curved section of the bracket.

10. A method for mounting an optical device having an optical element on a vehicle, comprising providing a bracket having a front surface, a back surface and an opening between the front and back surface;

mounting said front surface of said bracket to said vehicle; and mounting the optical device having a front surface and an optical element on said front surface, wherein said front surface of said optical device is removably attached to said back surface of said bracket;

wherein said bracket further comprises means for preventing fogging of said optical element;

wherein said bracket includes an opening and wherein light is provided to said optical element through said opening, and wherein said means for preventing fogging is a sealing device located around said opening for creating a seal between said optical element and said vehicle windshield.

11. A method for mounting as set out in claim 10, wherein the optical element is a lens element.

\* \* \* \* \*